United States Patent [19]
Falzone

[11] 3,925,832
[45] Dec. 16, 1975

[54] FLUSHOMETER DEVICE
[75] Inventor: John Falzone, Brooklyn, N.Y.
[73] Assignee: The Raymond Lee Organization, Inc., New York, N.Y. ; a part interest
[22] Filed: Dec. 16, 1974
[21] Appl. No.: 533,298

[52] U.S. Cl. .................. 4/249; 403/362; 403/33
[51] Int. Cl.² ......................................... F16D 1/06
[58] Field of Search....... 16/114 R; 251/289; 4/67 R, 4/254, 249, 251; 403/362, 166, 33

[56] References Cited
UNITED STATES PATENTS
| | | | |
|---|---|---|---|
| 1,465,823 | 8/1923 | Hobeck et al. | 4/249 X |
| 2,587,962 | 3/1952 | Brazukas | 403/166 |
| 3,406,940 | 10/1968 | Kertell | 251/289 |

Primary Examiner—Andrew V. Kundrat
Attorney, Agent, or Firm—Daniel Jay Tick

[57] ABSTRACT

A fastener removably affixes a handle extension to the handle of a flushometer in a manner whereby the handle extension extends vertically from the handle. Movement of the handle extension in predetermined directions moves the handle in corresponding predetermined directions to operate the flushometer.

2 Claims, 2 Drawing Figures

FLUSHOMETER DEVICE

DESCRIPTION OF THE INVENTION

The present invention relates to a flushometer device.

Objects of the invention are to provide a flushometer device of simple structure, which is inexpensive in manufacture, installable with facility and convenience by anyone, skilled or unskilled, utilizable by anyone with facility and convenience, and functions efficiently, effectively and reliably to permit people to operate the flushometer without bending or stooping, while standing erect.

Figure 1:
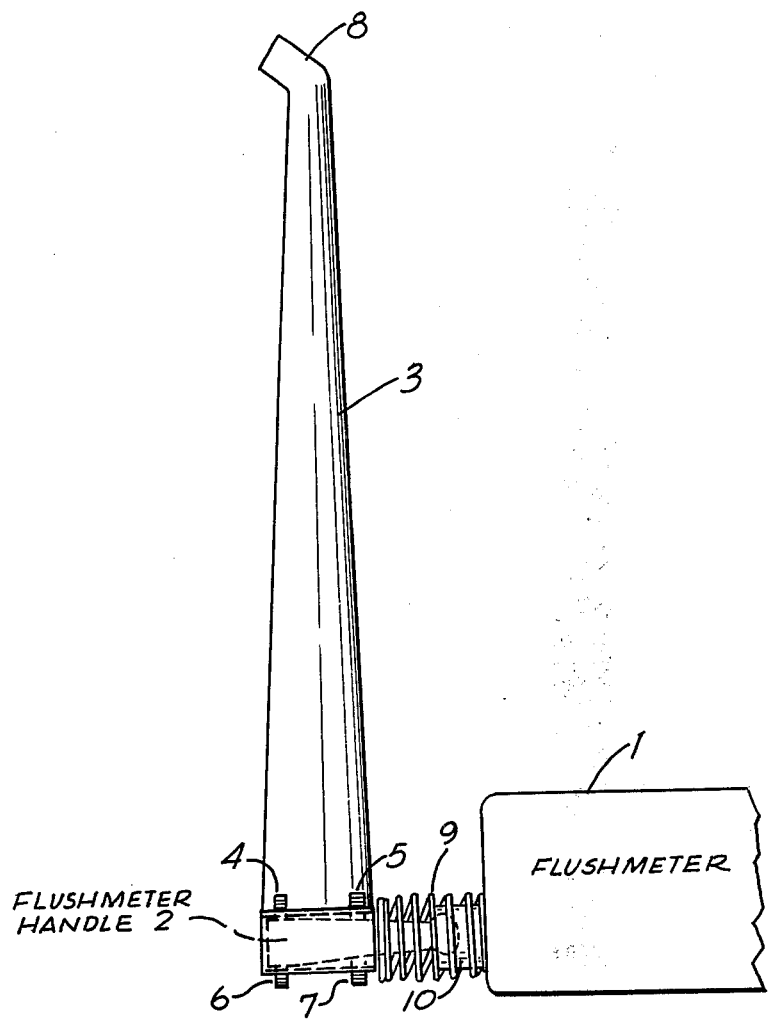
Figure 2:
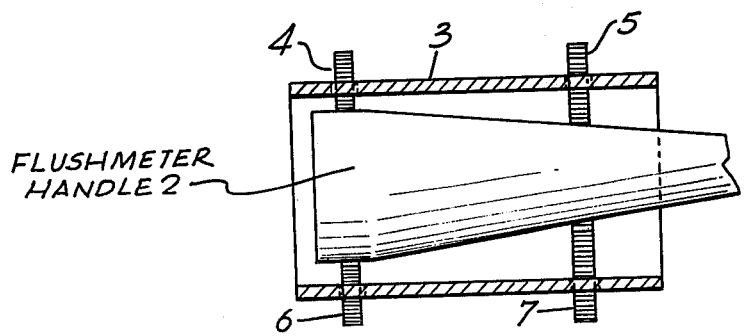

In order that the invention may be readily carried into effect, it will now be described with reference to the accompanying drawing, wherein:

FIG. 1 is a side view of an embodiment of the flushometer device of the invention; and FIG. 2 is a top view, on an enlarged scale, partly in section, of part of the embodiment of FIG. 1.

The flushometer device of the invention is for a flushometer 1, of any suitable known type, having a handle 2, of any suitable known type, extending substantially horizontally therefrom for operating the flushometer when it is moved in predetermined directions, such as, for example, up and down.

The flushometer device of the invention, comprises a handle extension 3. The handle extension 3 is removably affixed to the handle 2 by a fastening device 4, 5, 6 and 7. The fastening device comprises four screws threadedly coupled in internally threaded bores formed through the handle extension 3 and tightened into close abutment with the handle 2.

The handle extension 3 is affixed to the handle 2 in a manner whereby the handle extension extends substantially vertically from the handle whereby movement of the handle extension in predetermined directions moves the handle in corresponding predetermined directions to operate the flushometer. The handle extension 3 is bent at its free end 8 (FIG. 1) to provide the user with a better grip on it.

A substantially helical spring 9 is provided around part 10 of the flushometer 1 and part of the handle 2. The spring 9 abuts the handle extension 3 and maintains the handle extension in substantially vertical position, as shown in FIG. 1.

While the invention has been described by means of a specific example and in a specific embodiment, I do not wish to be limited thereto, for obvious modifications will occur to those skilled in the art without departing from the spirit and scope of the invention.

I claim:

1. A flushometer device for a flushometer having a handle extending substantially horizontally therefrom for operating the flushometer, when it is moved in predetermined directions, said flushometer device comprising a handle extension; and fastening means removably affixing the handle extension to the handle of a flushometer in a manner whereby the handle extension extends substantially vertically from the handle whereby movement of the handle extension in predetermined directions moves the handle in corresponding predetermined directions to operate the flushometer, said fastening means comprising a plurality of screws threadedly coupled in internally threaded bores formed through the handle extension and in close abutment with the handle of the flushometer.

2. A flushometer device as claimed in claim 1, further comprising a substantially helical spring around part of the flushometer and part of the handle, said spring abutting the handle extension for maintaining the handle extension in substantially vertical position.

* * * * *